B. A. LINDERMAN.
POSITIONING MECHANISM.
APPLICATION FILED SEPT. 4, 1917.
1,316,051.
Patented Sept. 16, 1919.
6 SHEETS—SHEET 1.
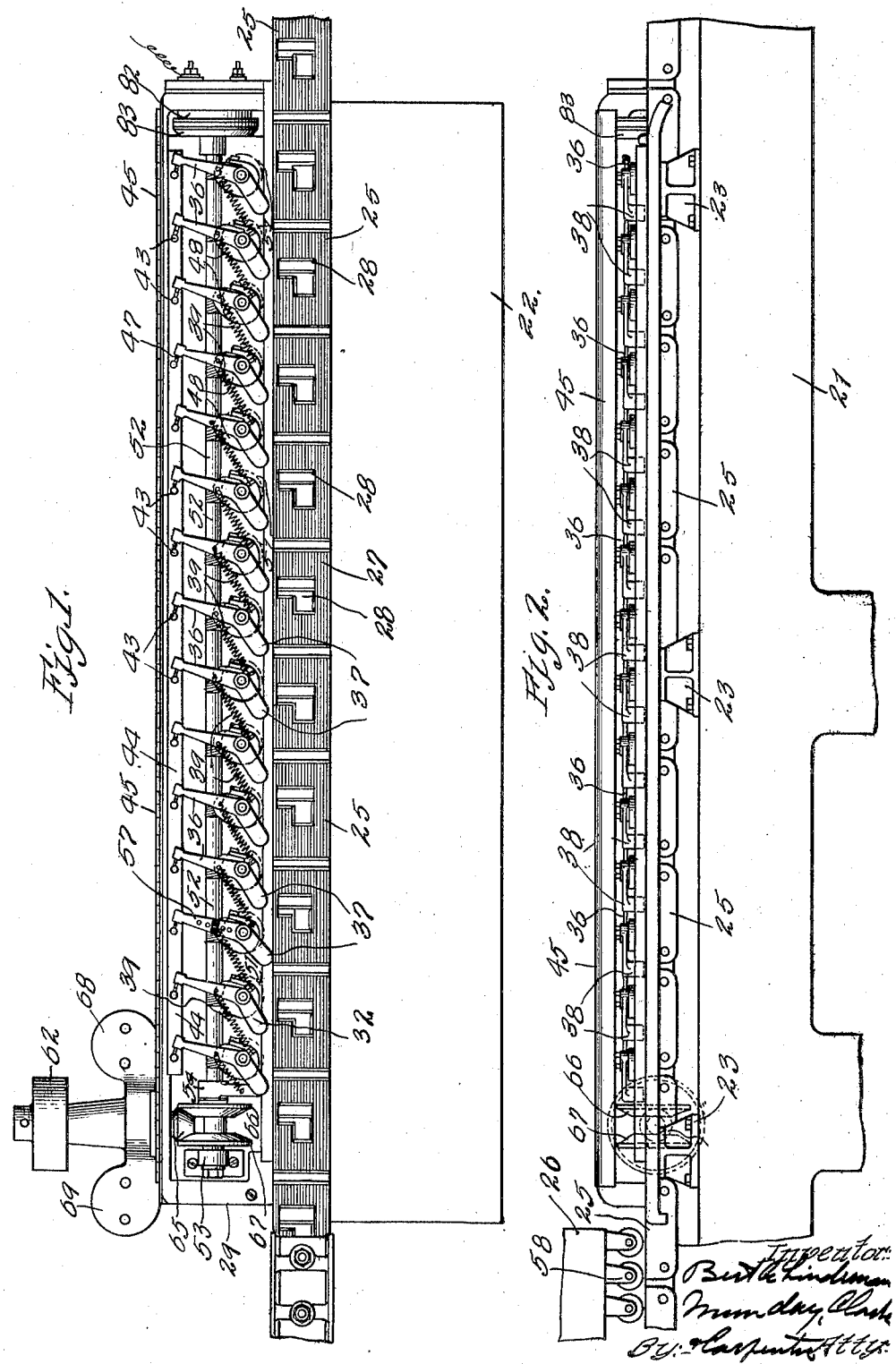

B. A. LINDERMAN.
POSITIONING MECHANISM.
APPLICATION FILED SEPT. 4, 1917.

1,316,051.

Patented Sept. 16, 1919.
6 SHEETS—SHEET 2.

B. A. LINDERMAN.
POSITIONING MECHANISM.
APPLICATION FILED SEPT. 4, 1917.
1,316,051.
Patented Sept. 16, 1919.
6 SHEETS—SHEET 3.
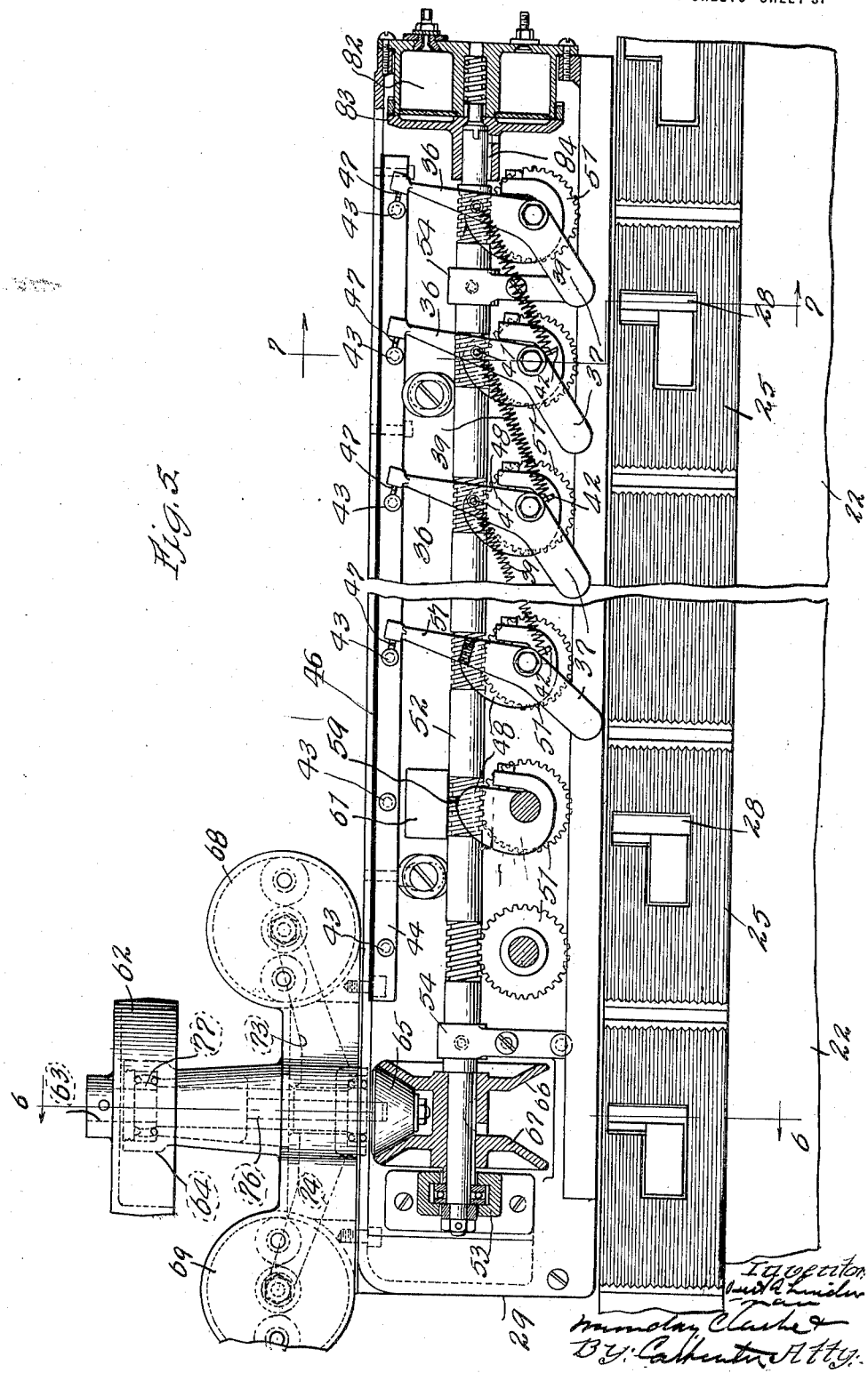

B. A. LINDERMAN.
POSITIONING MECHANISM.
APPLICATION FILED SEPT. 4, 1917.
1,316,051.
Patented Sept. 16, 1919.
6 SHEETS—SHEET 4.
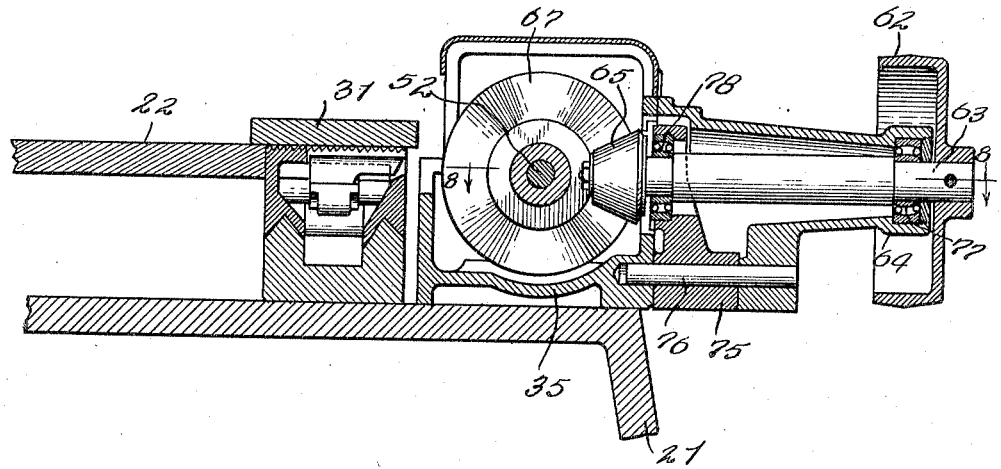
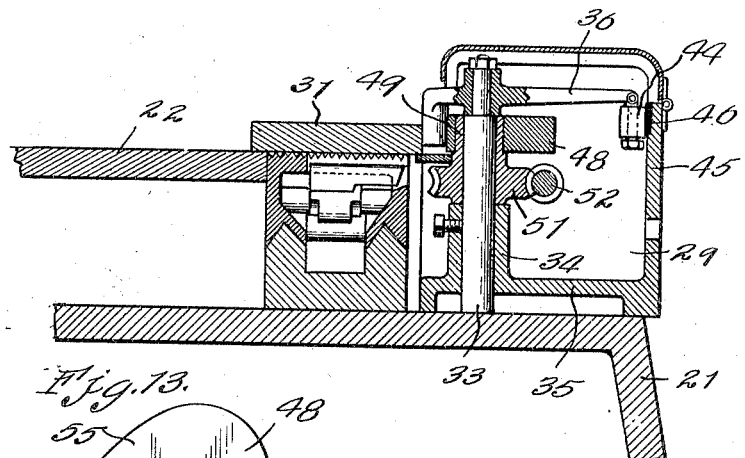
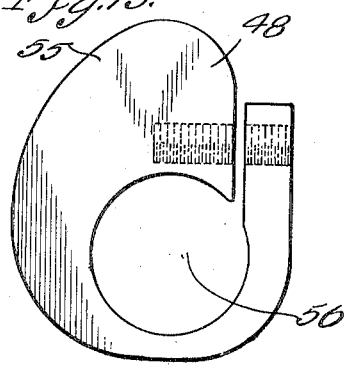

B. A. LINDERMAN.
POSITIONING MECHANISM.
APPLICATION FILED SEPT. 4, 1917.
1,316,051.
Patented Sept. 16, 1919.
6 SHEETS—SHEET 5.
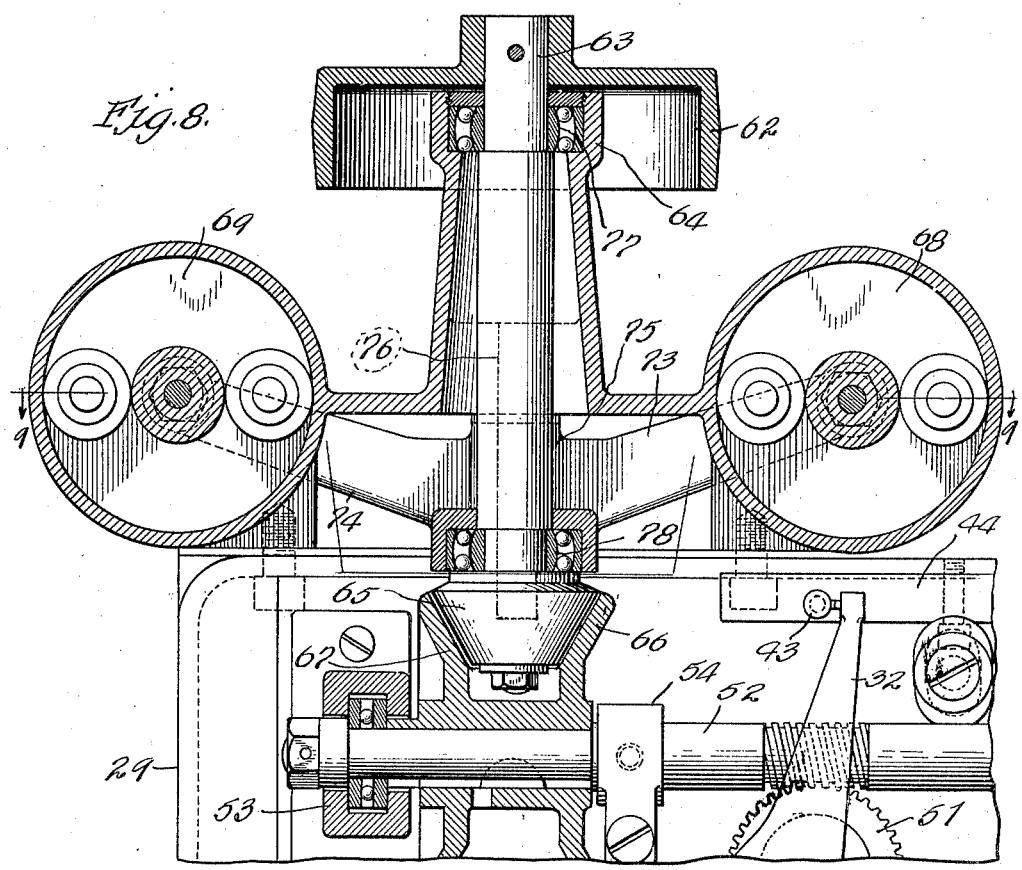
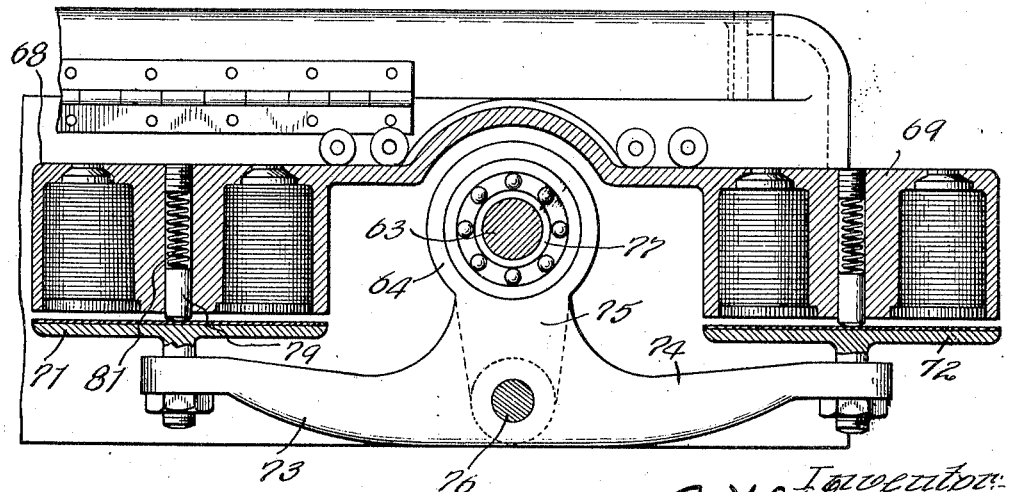

B. A. LINDERMAN.
POSITIONING MECHANISM.
APPLICATION FILED SEPT. 4, 1917.

1,316,051.

Patented Sept. 16, 1919.
6 SHEETS—SHEET 6.

UNITED STATES PATENT OFFICE.

BERT ARTHUR LINDERMAN, OF MUSKEGON, MICHIGAN.

POSITIONING MECHANISM.

1,316,051. Specification of Letters Patent. Patented Sept. 16, 1919.

Application filed September 4, 1917. Serial No. 189,531.

*To all whom it may concern:*

Be it known that I, BERT A. LINDERMAN, a citizen of the United States, residing in Muskegon, in the county of Muskegon and State of Michigan, have invented a new and useful Improvement in Positioning Mechanism, of which the following is a specification.

This invention relates in general to feeding or positioning devices, and has more particular relation to an operation used in connection with the positioning and feeding of boards and other like objects to a machine for operating upon them. It will, however, be understood that it is my intention to protect my invention against unauthorized application to such other uses to which it may be applicable.

The invention has for its principal object the positioning of a board or other article in accurate relation with respect to a theoretic line of operation, that is to say, to position the article in accurate predetermined position transversely of a conveyer, support or other part in order that it may be accurately fed into a machine operating upon it.

The invention is hereinafter described in connection with the handling of wood boards of uneven or irregular edge which must be operated upon either merely to true the edge or to both true it and provide a dovetail or other desired formation. In such connection the invention has a principal valuable use in that it is adapted to provide for the arrangement of the board so that a minimum amount of material may be removed in the truing or truing and forming operation. That is to say, if the edge of the board be curved and it is necessary to saw or plane such edge to a true or straight line, this line may be located as close to the edge as is practicable and with absolute accuracy; thereby effecting an economy in the work of the machine and a greater economy in the saving of the material of the board.

A further object of the invention is the provision of a structure of this character which will be entirely automatic in its action and which may be operated and used by the ordinary mechanic and without the necessity of his understanding the construction and arrangement of the parts of the device.

A still further object of the invention is the provision of such structure which will be of simple, durable parts readily accessible for adjustment and repair and which may be cheaply constructed.

Other objects and advantages of the invention will be apparent as it is better understood from the following description when considered in connection with the accompanying drawing illustrating a preferred embodiment thereof.

On the drawings,

Figure 1 is a top plan view of a mechanism embodying my present invention with the cover removed;

Fig. 2 is a side elevation of the same with the cover in place;

Fig. 5 is an enlarged partial view similar to Fig. 1 and adapted to illustrate certain details of construction;

Fig. 6 is a section taken substantially on the line 6—6 of Fig. 5;

Fig. 7 is a section taken substantially on the line 7—7 of Fig. 5;

Fig. 8 is a partial horizontal section taken substantially in the plane of the line 8—8 of Fig. 6;

Fig. 9 is a section taken on the line 9—9 of Fig. 8;

Fig. 12 is a perspective view of one of the stops or fingers;

Fig. 13 is a top plan view of one of the cams; and

Figure 3:
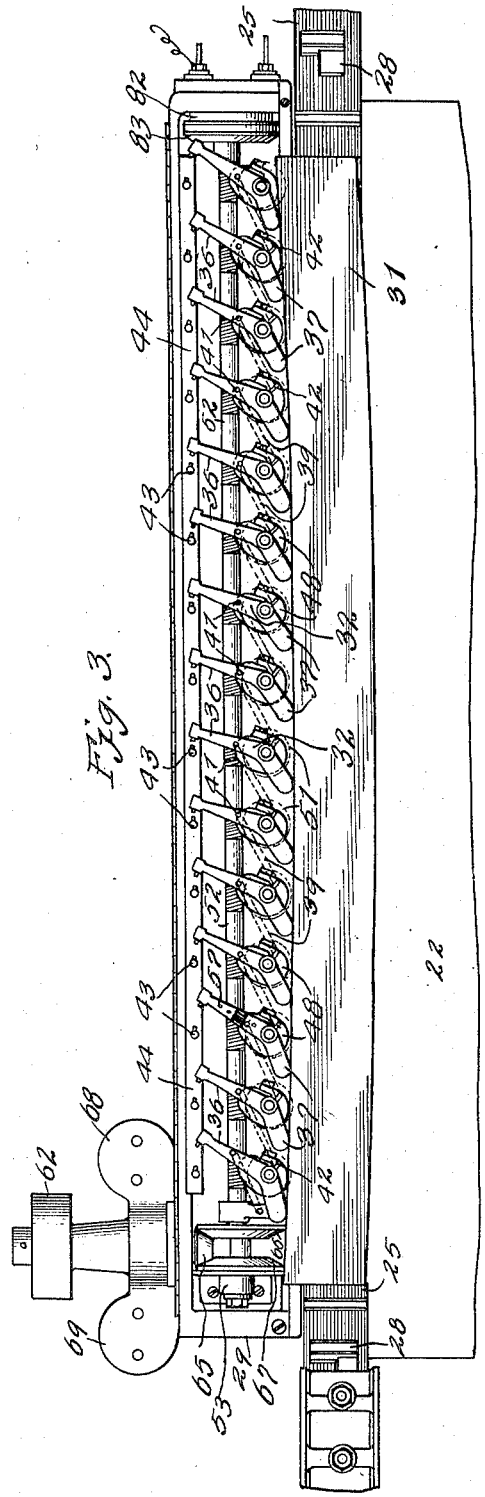
Fig. 3 is a top plan view with cover removed and showing the parts in the position they assume when the board is pushed against the stops.
Figure 4:
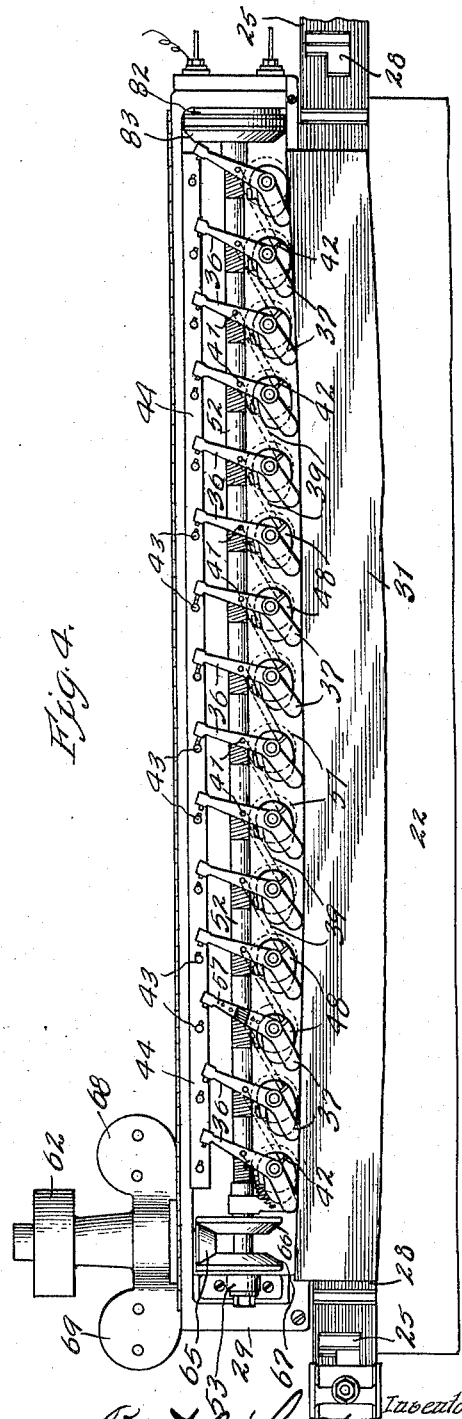
Fig. 4 is a view showing the position of the parts when the board has been returned to the position desired.

This invention contemplates the provision of a yielding abutment against which the board or other article may be pushed across a support or conveyer, together with associated mechanism and instrumentalities for subsequently moving it back accurately into a desired position with respect to a theoretic line of operation.

The embodiment of the invention shown on the drawing comprises a conveyer across which a board can be pushed into engagement with a yielding abutment of length equal to or greater than that of the board, the abutment being adapted to yield bodily under the pressure of the board with its portions arranged in accordance with any irregularities in the shape of the presented board edge. As soon as the board has been pushed against the abutment, positively driven means come into action to reverse the movement of the board across the conveyer bringing it to accurate relation with respect to a theoretic line of operation. In the present instance this operation may be considered to be a truing of the edge of the board through the sawing or planing away of the material necessary to accomplish this result.

For the purposes of illustrating the invention it may be assumed that some material must be removed along the entire edge of the board varying in amount at different portions of the edge, if the edge be irregular. It is of course highly desirable that arrangements be made to remove as little of the material as possible in this operation and the outward movement of the board is therefore terminated when the portions where least material must be removed have come into the desired relation with said theoretic line. In the present embodiment of the invention a number of yielding stops are employed, having a normal position at a side of said line a distance equal to the minimum thickness of material to be removed. The board is pushed up against these stops and all yield under the pressure. The yielding nature of the stops causes them to conform to the shape of the presented board edge. A set of cams conjointly movable then engage the board and move it back from the stops until any one of the stops arrives in normal position. This arranges the board in desired relation with respect to the devices for operating upon it.

Referring to the drawings in detail, reference character 21 indicates the main frame of the feeding device or mechanism and may represent a part of the main frame of the machine for operating upon the board or other article. At the top of this main frame there is provided a smooth table 22 carried upon brackets 23 in position to receive the board. The inner edge 24 of this table is disposed along the upper travel of a conveyer 25 adapted to move the boards into a dovetailing or other machine not shown completely on the drawing but indicated generally at 26. The upper surface of the conveyer is preferably substantially in the plane with the upper surface of the table and the conveyer is made up of block links 27 and carrying dogs 28 adapted to engage the end of the board to advance it after the board has been properly positioned thereon. The mechanism for accurately feeding this board on to the conveyer is disposed at the other side of the conveyer and is substantially inclosed in a housing generally indicated at 29. This mechanism comprises a yielding abutment against which the board indicated at 31 may be pushed from the table 22. The abutment in the present instance consists of a plurality of yielding and pivoted stops or fingers 32, each mounted upon a vertical stem or shaft 33 carried in a bearing boss 34 extending up from the bottom or base 35 of the housing 29. One of these stops or fingers is shown in detail in Fig. 12 and in position in Figs. 1 to 5. Each finger consists of a bell crank body having arms 36 and 37, the arm 36 being elongated and extending rearwardly from the pivotal stem or shaft 33, the other arm 37 normally extending out and at an angle into the path of the board. At the forward end this arm is provided with a downwardly extending leaf or part 38 adapted to be engaged by the board to move the finger when a board is pushed against the abutment of which the finger may be considered to form a part. Springs 39 are provided to hold the stops or fingers in normal position, i. e the position shown in Fig. 1, one end of each spring engaging a stud 41 on an arm 36 of one stop or finger and a similar stud or pin 42 on the hub of an adjacent stop or finger, the springs tending to pull the arms 36 to the left or in a counter-clockwise direction viewing the figures of the drawings. The normal position of the fingers is determined by fixed stops 43 located upon a bar 44 mounted upon the rear wall 45 of the housing, these stops limiting the movement of the fingers under the pulling action of the springs. The bar 44 is insulated electrically at 46 from the housing and the other parts of the machine and forms a portion of the electric controlling circuits to be described in detail hereinafter.

The arms also form a part of these circuits and to this end contact points 47 are provided to engage when the arms 36 of the fingers encounter appropriately arranged stops. When a board is shoved against the arms 37, 38 of the stops or fingers all of the stops or fingers are swung, as indicated in Fig. 3, and it will be noted that the arrangement is such that all of the fingers may be moved out of contact with the posts or fixed stops 43 of the bar 44. It will also be noted, on viewing this figure, that where the board has an irregular edge or an edge tapering from the true straight line, the stops or fingers will be variously moved and in accordance with the location of the points engaged by the several stops. The device is so controlled, in the present instance electrically, that mechanism is set in motion as soon as the last finger moves from contact with its companion post or stop 43, which mechanism moves the board back into the accurate position desired.

This mechanism, in the present instance, comprises a plurality of cams 48, each mounted upon a hub 49 of a worm wheel or pinion 51 freely rotatable on a shaft or post 33. The worm wheels or pinions 51 engage worm teeth upon a shaft 52 extending longitudinally of the machine and journaled in a thrust bearing 53 at one end and in spaced bearing arms 54 supported from the base of the housing (see Fig. 5). The movement of the fingers out of contact with the fixed stops 43 results in a rotation of the shaft 52 and a consequent conjoint projection of the cams 48. Each of these cams consists, in the present instance, of a dwell or operative curved portion 55 eccentrically positioned with respect to the apertures 56 through which the hub 49 of the pinion 51 extends. The cams have a normal position, shown in Fig. 1, and they rotate toward the left in a counter-clockwise direction to move back the board. The cams all rotate simultaneously and carry the board back bodily until one of the fingers is again in electric connection with its corresponding stop 43. At this time movement of the cams cease and the board is positioned. This movement has disposed the point of minimum cut on the theoretic line of operation. From this position the board is picked up by the conveyer 25 and moved forward or toward the left into the machine for operating upon it, the cams remaining in the position just described until such time as return to normal position is desired.

In the present instance this return is accomplished through the completion of an electric control for rotating the shaft 52 in an opposite direction. One of the fingers, the one indicated at 57 on the drawing, is utilized to control this return electric circuit. It will be noted that the finger 57 is located so that it will be engaged by the board almost until the board has left the positioning device and until it has passed under pressure rollers, indicated at 58, and which form a part of the holding devices in the dovetailing machine. Viewing the finger 57 it will be noted that the arms of this finger are disposed at a wider angle than are the arms of the other fingers employed. The electric circuit for returning the cams is completed and established when the finger 57 engages its stop 43 on the bar 44 and this wide angularity is desirable to insure against the finger 57 being the first to return to normal position when the cams move the board back in positioning. The angularity is sufficient to prevent any possible establishment of contact between finger 57 and its post 43 until the end of the board has passed its arm 37. The cams return with the reverse rotation of the shaft 52 until the circuit established by the finger 57 is broken, which occurs when a moving contact 59 (Fig. 5) is engaged by a cam near which it is positioned. The cam coming around moves the contact 59 inwardly of a housing 61 in which it serves to complete a connection when in extended position.

Power is introduced into the machine from a pulley 62 fixed upon the end of a shaft 63 (Figs. 5, 6, 8 and 9), which shaft has bearings in the end of a sleeve 64 extending out from the housing, forming a projecting hollow arm. This shaft carries, at its inner end, a clutch cone 65 adapted to engage either one of two clutch disks 66 or 67 upon the shaft 52 and to be moved from the engagement of the one into the engagement of the other. This movement is very slight and it is accomplished by a pair of electromagnets, indicated at 68 and 69, mounted upon the housing. Two armatures 71 and 72 are carried upon outwardly extending arms 73 and 74 of a swinging bearing bracket 75 movable about a pivot stud 76. Two universal ball bearing supports 77 and 78 are provided to permit the necessary movement of the shaft 63, one of these universal frictionless bearings being carried at the end of the sleeve 64 and the other in the swinging bracket 75. It will be noted upon comparing Figs. 8 and 9 that if the magnet 68 is energized the cone 65 engages the disk 67 and imparts a movement to the shaft 52 in one direction and that if the magnet 69 be energized the cone 65 engages the other disk 66 to impart movement to the shaft in the opposite direction. Pins 79 pressed outwardly by springs 81 in the magnets serve to insure a free movement of each armature away from its magnet after the magnet has been deënergized.

The parts are ordinarily brake held and in the present instance this brake is electrically controlled upon the end of the shaft 52 at the right side of the drawings. A magnet, generally indicated at 82, is mounted in line with the shaft and may attract an armature 83 keyed at 84 on the end of the shaft. Energization of this magnet attracts the armature and causes instant cessation of the rotation of the shaft both after projecting the cams and after retracting them.

Figure 14:
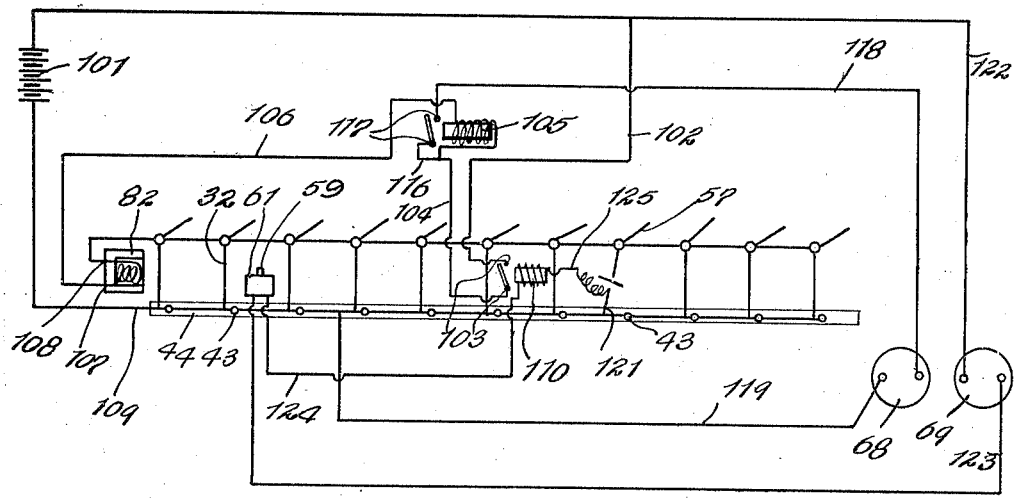
Fig. 14 is a diagrammatic view of the electric wiring employed.

Three electric circuits are utilized in the present control,—one for controlling the brake and thus normally maintaining the cams inoperative; a second, a circuit for actuating the magnet controlling the rotation of the shaft to project the cams, which may be taken to be the magnet 68; and a circuit for actuating the magnet to return the cams, which may be taken to be the magnet 69. These three circuits are made interlocking through the provision of suitable relay or magnetic switches so that when one circuit is in operative position the other circuits are of necessity interrupted; and so arranged also that the other circuits can only become operative in the order desired. The arrangement of these circuits is shown in Fig. 14. In this figure reference character 101 may be taken to indicate a suitable source of electrical energy. Considering first the arrangement of the circuit for controlling magnet 82, which is the brake magnet, an energization of which maintains the machine in normal condition, it has been stated that this circuit is established whenever a contact is made between a finger or stop 32 and a contact 43. On the diagrammatic view it comprises a wire 102 leading from source of energy 101 to one side of switch contacts 103 and wire 104 leading from the other side of switch contacts 103 to a break circuit magnet 105. From break circuit magnet 105 a wire 106 leads to one side 107 of magnet 82, the other side 108 being connected in any suitable fashion with all of the fingers 32. In the present instance the connection between magnet 82 and the fingers 32 is through the metal of the apparatus. When a finger 32 is in engagement with a post or fixed contact 43, connection is made with bar 44 and this bar 44 is connected by a wire 109 with the other side of the battery. The magnet 105 serves to interrupt the circuit for magnet 68 and the break circuit itself is interrupted by a magnet 110 located in the circuit for magnet 69, as will be later described.

Figure 10:
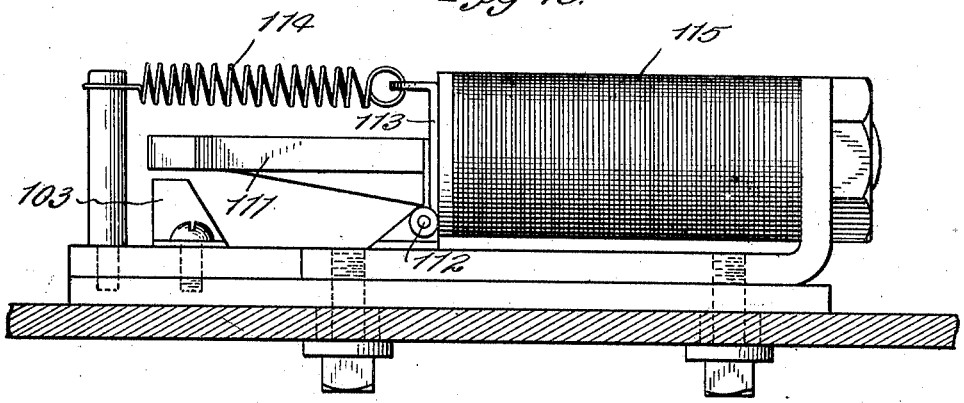
Fig. 10 is an enlarged side elevation of one of the electric control magnets used in the present embodiment of the invention.
Figure 11:
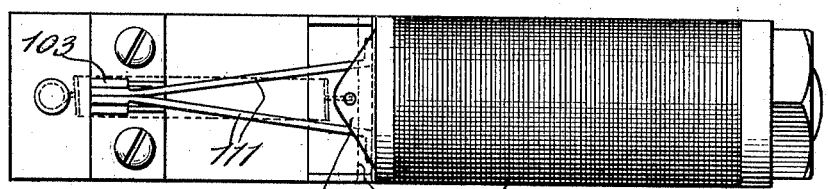
Fig. 11 is a top plan view of the same.

Each of the magnets 105 and 110 may have of course any preferred construction but both are shown in Figs. 10 and 11 as comprising a movable connecting arm 111 which is pivoted at 112 and carries an armature 113. The end of the arm 111 is adapted to swing between two contacts 103 to complete the circuit, a spring 114 being provided to move the arm 111 into operative position upon deënergization of the magnet coils 115.

From the description of the break circuit just given it will be noted that this circuit is maintained so long as any one of the arms 32 is in contact with a post 43 and that so long as it is maintained magnet 105 is energized. When, however, this magnet ceases to be energized through the interruption of the brake circuit by the movement of the last finger 32 away from its contact 43, a circuit for energizing magnet 68 to project the cams is automatically established. This circuit comprises wire 102 from battery to points 103 which are closed except at such times as magnet 69 is energized, from points 103 along wire 104 to wire 116 connected to points 117 of magnet 105, analogous to points 103 of magnet 110. From points 117 the circuit includes a wire 118 to one side of magnet 68. From the other side of magnet 68 wire 119 connects with bar 44 and wire 109 completes the circuit from bar 44 to battery.

As has been stated this circuit is automatically established when the fingers are all disengaged from the posts or contacts 43 and it remains operative projecting the cams until one of the fingers is permitted by the edge of the board to move back again to its normal position, which thereby through engagement with its post 43 reëstablishes the brake circuit and automatically interrupts the cam projecting circuit at the magnet 105. This now established break circuit remains operative holding the cams quiescent until the board has moved past the finger 57. This finger has an electrically operative end 121 insulated from the body of the finger and also from any ground or other contact with the rest of the machine. When the finger 57 has been permitted to swing to its normal position by reason of movement of the end of the board past it, circuit for the magnet 69 is established, this circuit comprising a wire 122 connecting magnet 69 with wire 102 in turn connected to battery. A wire 123 leads from the magnet 69 to one terminal of contact box 61 and from the other terminal of this contact box a wire 124 leads to magnet 110, which in turn is connected by a wire 125 with end 121 of finger 57. When finger 57 engages its post 43 the circuit is completed by bar 44 and wire 109 leading to battery. Energization of magnet 110 interrupts the brake circuit at contacts 103 and permits the completion of circuit of magnet 69 to rotate the shaft in a direction to return the cams to normal position, which circuit is maintained until the appropriate cam engages movable contact 59 of contact box 61 to interrupt this return circuit, thereupon deënergizing magnet 110 and permitting reëstablishment instantaneously of the brake circuit.

It will be noted from the foregoing description of the specific embodiment I have shown and described of my invention that the board is forced against an abutment adapted to yield at a plurality of distributed points and that after so yielding the board is pushed back by the presentation of rigidly advancing distributed points. Rigid points engage the portions of the board where the greatest amount of material must be removed and the movement of the board is determined by the yielding point engaging the portion of the board where the least material is to be removed. The effect of the yielding points is that of a yielding abutment and the effect of the cams is that of a rigidly projected abutment.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A mechanism for feeding boards and other articles, comprising in combination a yielding abutment against which said board or article may be pushed, and means having an action determined by the movement of said abutment for moving said board or article laterally into accurate position.

2. A mechanism for feeding boards and other articles, comprising in combination an abutment adapted to yield in accordance with the shape of an article pushed thereagainst, and means having an action determined by the movement of said abutment for moving said board or article laterally and into accurate feeding position.

3. A mechanism for feeding boards and the like, comprising in combination a yielding abutment against which the board or other article may be pushed, and means for moving said board or other article outwardly from and in opposite direction to its movement against said abutment in amount determined by the yielding of said abutment and into accurate position.

4. A mechanism for feeding boards and the like, comprising in combination an abutment yieldable in accordance with the presented edge of a board or other article pushed thereagainst, and means for moving said board or other article bodily laterally in accordance with the relative movement of different portions of said abutment to bring said board or article to accurate position.

5. A mechanism for feeding boards and other articles, comprising in combination an abutment yieldable in accordance with the presented edge of a board or other article pushed thereagainst, and means for moving said board or other article bodily laterally in accordance with the movement of the portion of said abutment yielding least to accurately position said board.

6. A mechanism for feeding boards and other articles comprising in combination an abutment yieldable in accordance with the presented edge of a board or other article pushed thereagainst, means for moving said board laterally into accurate position and in accordance with the yield of said abutment, said means being returnable to normal position after said board or article has subsequently moved a predetermined distance.

7. A mechanism for feeding boards and other articles, comprising in combination an abutment yieldable in accordance with the presented edge of a board or other article pushed thereagainst, and means rendered operable by the action of said abutment and for moving said board or other article laterally into accurate feeding position and in accordance with the yielding of said abutment.

8. A mechanism for feeding boards and other articles, comprising in combination an abutment yieldable in accordance with the presented edge of a board or other article pushed thereagainst, and means rendered operable during the yielding of said abutment for moving said board or other article laterally into accurate feeding position and in accordance with the yielding of said abutment.

9. A mechanism for feeding boards and other articles, comprising in combination an abutment yieldable in accordance with the edge of the board or other article pushed thereagainst, and reciprocating means for moving said board or other article laterally into feeding position and in accordance with the yielding of said abutment, said means being projected and returned under the control of said abutment.

10. A feeding mechanism for boards and other articles, comprising a conveyer, an abutment alongside said conveyer yieldable in accordance with a board pushed across said conveyer and into engagement with said abutment, and means movable toward said conveyer an amount determined by the yielding of said abutment for accurately positioning said board or other article upon said conveyer.

11. A mechanism for feeding boards or other articles, comprising in combination a conveyer, an abutment mounted alongside said conveyer and yieldable in accordance with the board or other article pushed across said conveyer and against said abutment, and means rendered operable by movement of said abutment for moving said board laterally and into accurate position on said conveyer and in accordance with the movement of said yielding abutment.

12. A mechanism for feeding boards and the like and adapted to arrange a board having an irregular edge in predetermined position with respect to a theoretical reference line of operation, comprising in combination an abutment yieldable from said line and in accordance with the shape of an edge of a board or other article pushed thereagainst and means for imparting a reverse movement to said board or other article until a portion of said abutment shall have returned to normal position.

13. A mechanism for feeding boards and the like and adapted to arrange a board having an irregular edge in predetermined position with respect to a theoretical reference line of operation, comprising in combination an abutment yieldable from said line and in accordance with the shape of an edge of a board or other article pushed thereagainst, and means for imparting a reverse movement to said board or other article until a portion of said abutment shall have returned to normal position, said means serving to guide said board or other article in initial subsequent movement.

14. A mechanism for feeding boards and the like and adapted to arrange a board having an irregular edge in predetermined position with respect to a theoretical reference line of operation, comprising in combination an abutment yieldable in accordance with the shape of an edge of a board or other article pushed thereagainst, and reciprocating means for moving said board or other article, the length of said reciprocation being determined by the position of the portion of the abutment having yielded least.

15. A mechanism for feeding boards and the like and adapted to arrange a board having an irregular edge in predetermined position with respect to a theoretical reference line of operation, comprising in combination an abutment yieldable in accordance with the shape of an edge of a board or other article pushed thereagainst, and reciprocating means for moving said board or other article, the length of said reciprocation being determined by the position of the portion of the abutment having yielded least, said means remaining quiescent at the end of its operative stroke to serve as a guide for the initial subsequent movement of said board.

16. A mechanism for feeding boards and other articles, comprising in combination a plurality of yielding stops adapted to engage presented points of the edge of a board or other article pushed thereagainst, and means for moving said board or other article laterally and until one of said stops has returned to normal position.

17. A mechanism for feeding boards or other articles, comprising in combination a plurality of yielding stops adapted to engage presented points of the edge of a board pushed thereagainst, and means for moving said board laterally and until one of said stops is returned to normal position, said means being rendered operable by the retracting movement of said stops.

18. A mechanism for feeding boards and other articles, comprising in combination a plurality of yielding stops adapted to engage presented points of the edge of a board or other article pushed thereagainst, and means for moving said board laterally until one of said stops has returned to normal position, said means remaining in the position thus attained until a predetermined stop is out of contact with said board.

19. A mechanism for feeding boards and other articles, comprising in combination a yielding stop adapted to engage a presented point on the edge of a board or other article pushed thereagainst, and a rigid member movable after said stop has yielded under pressure of said board or other article and in the opposite direction to move said board or other article to accurate position and in amount proportionate to the amount of movement of said stop.

20. A mechanism for feeding boards and other articles, comprising in combination a plurality of yielding stops adapted to engage presented points of the edge of a board or other article pushed thereagainst, means for moving said board laterally to an accurate position, and a control for said moving means and causing actuation thereof after said board or other article has moved said stops.

21. A mechanism for feeding boards and other articles, comprising in combination a plurality of yielding stops adapted to engage presented points of the edge of a board or other articles pushed thereagainst, means for moving said board laterally to an accurate position, and an electric control for said moving means and causing actuation thereof after said board or other article has moved said stops.

22. A mechanism for feeding boards and other articles, comprising a plurality of yielding stops adapted to engage presented points of the edge of a board or other article pushed thereagainst, means for moving said board back into a predetermined position with respect to a theoretical reference line of operation, actuating mechanism for said means, and a control for said actuating mechanism, said control producing actuation of said mechanism to move said board after the board has engaged and moved said stops.

23. A mechanism for feeding boards and other articles, comprising a plurality of yielding stops adapted to engage presented points of the edge of a board or other article pushed thereagainst, means for moving said board back into a predetermined position with respect to a theoretical reference line of operation, actuating mechanism for said means, and an electric control for said actuating mechanism, said control comprising an electric circuit completed through a stop in normal position and maintaining said means in retracted position, and an electric circuit completed by movement of said stop from normal position and for actuating said mechanism to move said board after said board has moved said stop from normal position.

24. A mechanism for feeding boards and other articles, comprising a plurality of yielding stops adapted to engage presented points of the edge of a board or other articles pushed thereagainst, means for moving said board back into a predetermined position with respect to a theoretical reference line of operation, actuating mechanism for said means, and an electric control for said actuating mechanism, said control comprising an electric circuit completed through a stop in normal position and maintaining said means in retracted position, and an electric circuit completed through interruption of the first mentioned circuit and for actuating said mechanism to move said board or other article after said board has engaged said stop.

25. A mechanism for feeding boards and other articles, comprising a plurality of yielding stops adapted to engage presented points of the edge of a board or other article pushed thereagainst, means for moving said board back into a predetermined position with respect to a theoretical reference line of operation, actuating mechanism for said means, and an electric control for said actuating mechanism, said control comprising an electric circuit completed after the board or other article has engaged a stop and moved the same from normal position and for actuating said mechanism to move said board, and an electric circuit completed after said board has moved away from said stops to return said means to normal position.

26. A mechanism for feeding boards and other articles, comprising a plurality of yielding stops adapted to engage presented points of the edge of a board or other article pushed thereagainst, means for moving said board back into a predetermined position with respect to a theoretical reference line of operation, actuating mechanism for said means, and an electric control for said actuating mechanism, said control comprising an electric circuit completed after the board or other article has engaged a stop and moved the same from normal position and for actuating said mechanism to move said board, and an electric circuit completed after said board has moved away from said stops to return said means to normal position, said last mentioned circuit being automatically interrupted by the return of said means to normal position.

27. A mechanism for feeding boards and other articles, comprising a plurality of yielding stops adapted to engage presented points of the edge of a board or other article pushed thereagainst, means for moving said board back into a predetermined position with respect to a theoretical reference line of operation, actuating mechanism for said means, and an electric control for said actuating mechanism, said control comprising an electric circuit completed after the board or other article has engaged a stop and moved the same from normal position and for actuating said mechanism to move said board, and an electric circuit completed after said board has moved away from said stops to return said means to normal position, and a circuit operable intermediate said mentioned circuits for retaining said means quiescent after said board has been positioned and until it ceases to engage said stops.

28. A mechanism for feeding boards or other articles, comprising a plurality of yielding stops adapted to engage presented points of the edge of a board or other article pushed thereagainst, means for moving said board back into a predetermined position with respect to a theoretical reference line of operation, actuating mechanism for said means, and an electric control for said actuating mechanism, said control comprising a shaft set in movement by the action of said stops to advance said means a desired amount, and a reversing mechanism operable after the board or other article has moved a predetermined distance after positioning for returning said means to normal position.

29. A mechanism for feeding boards or other articles, comprising a plurality of yielding stops adapted to engage presented points of the edge of a board or other article pushed thereagainst, means for moving said board back into a predetermined position with respect to a theoretical reference line of operation, said movement of the board being determined by the position of said stops, said means comprising members positively movable and engaging the board to bodily move it into desired position.

30. A mechanism for feeding boards or other articles, comprising a plurality of yielding stops adapted to engage presented points of the edge of a board or other article pushed thereagainst, means for moving said board back into a predetermined position with respect to a theoretical reference line of operation, said movement of the board being determined by the position of said stops, said means comprising a plurality of rotatable cams positively driven and actuated until one of said stops is in normal position.

31. A mechanism for feeding boards and the like to permit the disposal of a minimum amount of material at one side of a fixed theoretic line of operation, comprising means located at one side of said line for selecting the part or parts of an edge of said board or other article nearest said line and for shifting the board to accurate position with respect to said line.

32. A mechanism for feeding boards and the like to permit the disposal of a minimum amount of material at one side of a fixed theoretic line of operation, comprising means located at one side of said line for selecting the part or parts of an edge of said board or other article nearest said line and for shifting said part or parts to accurate position with respect to said line.

33. A mechanism for feeding boards and the like to permit the disposal of a minimum amount of material at one side of a theoretic line of operation, comprising means located at a side of said line for selecting the part or parts of an edge of said board or other article nearest said line and for determining the accurate position of the board with respect to said line, and means engaging the part or parts of the edge of said board farthest from said line for moving said board into proper position under the control of said first mentioned means.

34. A mechanism for feeding boards and other articles, comprising in combination a yielding abutment against which said board or other article may be pushed, and means subsequently operable and having an action determined by the movement of said abutment for moving said board or article laterally into accurate position.

35. A mechanism for feeding boards and other articles, comprising in combination a yielding abutment against which said board or article may be pushed, and means actuated in accordance with the difference in yielding of parts of said abutment for moving said board or article into accurate position.

36. A mechanism for feeding boards or other articles, comprising in combination a yielding abutment against which said board or article may be pushed, and means actuated in accordance with the yielding of the portion of the abutment which has yielded least when said board or article is pushed thereagainst for moving said board or article laterally into accurate position.

Signed.

BERT ARTHUR LINDERMAN.

Copies of this patent may be obtained for five cents each, by addressing the "Commissioner of Patents, Washington, D. C."